(12) United States Patent
Lin et al.

(10) Patent No.: US 12,081,343 B2
(45) Date of Patent: Sep. 3, 2024

(54) TRANSMITTING METHOD AND RECEIVING METHOD FOR FEEDBACK INFORMATION, DEVICE, TERMINAL DEVICE AND MEDIUM

(71) Applicant: GUANGDONG OPPO MOBILE TELECOMMUNICATIONS CORP., LTD., Guangdong (CN)

(72) Inventors: Yanan Lin, Guangdong (CN); Zuomin Wu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 355 days.

(21) Appl. No.: 17/548,582

(22) Filed: Dec. 12, 2021

(65) Prior Publication Data
US 2022/0140953 A1    May 5, 2022

Related U.S. Application Data

(63) Continuation of application No. PCT/CN2019/109547, filed on Sep. 30, 2019.

(51) Int. Cl.
*H04L 1/18* (2023.01)
*H04L 1/1812* (2023.01)
(Continued)

(52) U.S. Cl.
CPC .......... *H04L 1/1861* (2013.01); *H04L 1/1812* (2013.01); *H04W 72/23* (2023.01)

(58) Field of Classification Search
CPC ... H04W 28/04; H04W 72/04; H04W 72/042; H04W 88/08; H04W 72/23; H04L 5/0007; H04L 1/1861; H04L 1/1812
(Continued)

(56) References Cited

U.S. PATENT DOCUMENTS 11,617,195 B2 * 3/2023 Huang ................. H04L 5/0048
370/329
11,791,948 B2 * 10/2023 Babaei .................... H04L 1/188
370/329

(Continued)

FOREIGN PATENT DOCUMENTS

| CN | 101309129 | 11/2008 |
| CN | 109150476 | 1/2019 |

(Continued)

OTHER PUBLICATIONS

3GPP TSG RAN WG1 #96bis, Xi'an, China, Apr. 8-12, 2019, R1-1904624, Agenda Item: 7.2.2.2.3, Source: LG Electronics, Title: HARQ procedure for NR-U. (Year: 2019).*

(Continued)

*Primary Examiner* — Peter G Solinsky
*Assistant Examiner* — Sanjay K Dewan
(74) *Attorney, Agent, or Firm* — JCIP GLOBAL INC.

(57) ABSTRACT

A transmitting method and a receiving method for feedback information, a device, a terminal device, and a medium are provided. The method includes: receiving first signaling, where the first signaling carries N new feedback indicators (NFIs), the N NFIs correspond to N groups in one-to-one, and N is a positive integer; and transmitting a feedback codebook, where the feedback codebook comprises first feedback information corresponding to a first HARQ process, the first HARQ process is transmitted through a physical channel in a first group with a first value of NFI, the first group is one of the N groups, and the first value is the value of NFI corresponding to the first group among the N NFIs. Therefore, understanding ambiguity of the feedback information between the terminal device and the access network equipment is avoided, and utilization efficiency of transmitted resources is improved.

14 Claims, 8 Drawing Sheets

(51) Int. Cl.
*H04L 1/1829* (2023.01)
*H04W 72/04* (2023.01)
*H04W 72/23* (2023.01)

(58) Field of Classification Search
USPC .......................................................... 370/329
See application file for complete search history.

(56) References Cited

U.S. PATENT DOCUMENTS

| | | | |
|---|---|---|---|
| 2009/0040976 A1* | 2/2009 | Kim ...................... | H04L 1/1812 455/73 |
| 2010/0067468 A1* | 3/2010 | Ho ........................ | H04L 1/1812 714/748 |
| 2014/0241254 A1* | 8/2014 | Kaur ..................... | H04W 76/14 370/329 |
| 2016/0044657 A1* | 2/2016 | Park ...................... | H04L 1/1812 370/329 |
| 2018/0027548 A1* | 1/2018 | Suzuki .................. | H04W 72/12 370/329 |
| 2018/0123744 A1* | 5/2018 | Nogami .............. | H04W 52/248 |
| 2019/0150128 A1* | 5/2019 | Suzuki ..................... | H04L 1/18 370/329 |
| 2020/0099476 A1* | 3/2020 | Park ........................ | H04W 4/70 |
| 2023/0118350 A1* | 4/2023 | Bang ..................... | H04L 1/1854 370/329 |
| 2023/0130633 A1* | 4/2023 | Babaei .................. | H04L 1/1854 370/329 |
| 2023/0199740 A1* | 6/2023 | Li ....................... | H04W 72/563 370/329 |

FOREIGN PATENT DOCUMENTS

| | | | | |
|---|---|---|---|---|
| CN | 110138514 | | 8/2019 | |
| EP | 2 826 177 A1 | * | 1/2015 | ........... H04L 1/1864 |
| EP | 2826177 | | 1/2015 | |
| WO | 2017080615 | | 5/2017 | |

OTHER PUBLICATIONS

3GPP TSG RAN WG1 #97, Reno, USA, May 13-17, 2019, R1-1906677, Agenda Item: 7.2.2.2.3, Source: LG Electronics, Title: HARQ procedure for NR-U. (Year: 2019).*

3GPP TSG RAN WG1 Meeting #98, Prague, Czech Republic, Aug. 26-Aug. 30, 2019, R1-1909247, Agenda Item: 7.2.2.2.3, Source: Qualcomm Incorporated, Title: Enhancements to Scheduling and HARQ operation for NR-U. (Year: 2019).*
3GPP TSG RAN WG1 #97, Reno, USA, May 13-17, 2019, R1-1906545, Agenda Item: 7.2.2.2.3, Source: MediaTek Inc., Title: Enhancements to HARQ for NR-U operation. (Year: 2019).*
3GPP TSG-RAN WG1 Meeting #98, Prague, Aug. 26-30, 2019, R1-1909300, Agenda Item: 7.2.2.2.3, Source: Ericsson, Title: HARQ and scheduling enhancements for NR-U. (Year: 2019).*
"Office Action of Europe Counterpart Application, Application No. 19947851.2", issued on Jan. 25, 2023, pp. 1-10.
Office Action of China Counterpart Application, Application No. 202210089498.8, with English translation thereof, Issued on Jan. 19, 2023, pp. 1-14.
LG Electronics, "HARQ procedure for NR-U", 3GPP TSG RAN WG1 #96bis, R1-1904624, Apr. 8-12, 2019, pp. 1-11.
Huawei, "Feature lead summary#2 of HARQ enhancements for NR-U", 3GPP TSG RAN WG1 Meeting #98, R1-1909694, Aug. 26-30, 2019, pp. 1-29.
"International Search Report (Form PCT/ISA/210) of PCT/CN2019/109547", mailed on Jun. 23, 2020, with English translation thereof, pp. 1-6.
"Written Opinion of the International Searching Authority (Form PCT/ISA/237) of PCT/CN2019/109547", mailed on Jun. 23, 2020, with English translation thereof, pp. 1-6.
Office Action of China Counterpart Application, Application No. 202210089498.8, with English translation thereof, Issued on Apr. 18, 2023, pp. 1-12.
"Search report of counterpart Europe application No. 19947851.2", issued on May 31, 2022, pp. 1-21.
LG Electronics, "HARQ procedure for NR-U", 3GPP TSG RAN WG1 Meeting #97 R1-1906677, May 2019, pp. 1-17.
Qualcomm Incorporated, "Enhancements to Scheduling and HARQ Operation for NR-U", 3GPP TSG RAN WG1 Meeting #98 R1-1909247, Aug. 2019, pp. 1-19.
Mediatek Inc., "Enhancements to HARQ for NR-U operation", 3GPP TSG RAN WG1 Meeting #97 R1-1906545, May 2019, pp. 1-11.
Ericsson, "HARQ and scheduling enhancements for NR-U", 3GPP TSG RAN WG1 Meeting #R1-1909300, Aug. 2019, pp. 1-13.
3GPP, "3rd Generation Partnership Project; Technical Specification Group Radio Access Network; NR; Physical layer procedures for control(Release 15)", 3GPP TS 38.213 V15.7.0, Sep. 2019, pp. 1-108.

* cited by examiner

TRANSMITTING METHOD AND RECEIVING METHOD FOR FEEDBACK INFORMATION, DEVICE, TERMINAL DEVICE AND MEDIUM

CROSS-REFERENCE TO RELATED APPLICATION

This application is a continuation of international PCT application serial no. PCT/CN2019/109547, filed on Sep. 30, 2019. The entirety of the above-mentioned patent application is hereby incorporated by reference herein and made a part of this specification.

TECHNICAL FIELD

This disclosure relates to the field of mobile communications, and in particular, to a transmitting method and a receiving method of feedback information, a device, a terminal device, and a medium.

DESCRIPTION OF RELATED ART

In order to ensure the reliability of communication transmission, it is necessary to provide feedback to the transmission. In mobile communication, a base station transmits downlink data to a terminal device in a hybrid automatic repeat request (HARQ) mode. After receiving the downlink data transmitted through a specific HARQ process, the terminal device needs to return HARQ feedback information to the base station. The HARQ feedback information is, for example, ACK (representing correct reception) and NACK (representing incorrect reception).

After transmitting a data block TB a, the HARQ process is scheduled to transmit a new data block TB b. At this time, the terminal device only receives the data block TB a but not the data block TB b. When performing the HARQ feedback of the HARQ process, the base station assumes that what the terminal device transmits is the ACK/NACK feedback information corresponding to TB b, but what the terminal device actually transmits is the ACK/NACK feedback information corresponding to TB a. In the related art, the new data indicator (NDI) in the downlink control signaling downlink control information (DCI) is used to avoid the abovementioned understanding ambiguity. The NDI information field is toggled compared to the previous time, indicating that the feedback is new data, such as 0 at the previous time and 1 at this time. The NDI information field is the same as the previous one, indicating that the feedback is retransmitted data, such as 0 at the previous time, and 0 this time. Optionally, the base station further indicates the NDI information corresponding to each HARQ process when triggering process feedback, or the terminal device reports the NDI information of each process to the base station together when reporting the ACK/NACK information.

In the above manner of relying on NDI to avoid understanding ambiguity of feedback information, each HARQ process needs corresponding NDI information, so the transmission overhead is relatively large.

SUMMARY

The embodiments of the disclosure provide a transmitting method and a receiving method for feedback information, a device, a terminal device, and a medium. The technical solution is provided as follow:

According to an aspect of the disclosure, a transmitting method for feedback information is provided, and the method includes the following steps.

First signaling is received. The first signaling carries N new feedback indicators (NFIs), the N NFIs correspond to N groups in one-to-one, and N is a positive integer.

A feedback codebook is transmitted. The feedback codebook includes first feedback information corresponding to a first HARQ process. The first HARQ process is transmitted through a physical channel in a first group with a first value of NFI, the first group is one of the N groups, and the first value is a value of NFI corresponding to the first group among the N NFIs.

According to an aspect of the disclosure, a receiving method for feedback information is provided, and the method includes the following steps.

First signaling is transmitted. The first signaling carries N new feedback indicators (NFIs), the N NFIs correspond to N groups in one-to-one, and N is a positive integer.

A feedback codebook is received. The feedback codebook includes first feedback information corresponding to a first HARQ process. The first HARQ process is transmitted through a physical channel in a first group with a first value of NFI, the first group is one of the N groups, and the first value is the value of NFI corresponding to the first group among the N NFIs.

According to an aspect of the disclosure, a transmitting device for feedback information is provided, and the device includes a receiving module and a transmitting module.

The receiving module is configured for receiving first signaling. The first signaling carries N new feedback indicators (NFIs), the N NFIs correspond to N groups in one-to-one, and N is a positive integer.

The transmitting module is configured for transmitting a feedback codebook. The feedback codebook includes first feedback information corresponding to a first HARQ process. The first HARQ process is transmitted through a physical channel in a first group with a first value of NFI, the first group is one of the N groups, and the first value is the value of NFI corresponding to the first group among the N NFIs.

According to an aspect of the disclosure, a receiving device for feedback information is provided, and the device includes a transmitting module and a receiving module.

The transmitting module is configured for transmitting first signaling. The first signaling carries N new feedback indicators (NFIs), the N NFIs correspond to N groups in one-to-one, and N is a positive integer.

The receiving module is configured for receiving a feedback codebook. The feedback codebook includes first feedback information corresponding to a first HARQ process. The first HARQ process is transmitted through a physical channel in a first group with a first value of NFI, the first group is one of the N groups, and the first value is the value of NFI corresponding to the first group among the N NFIs.

According to an aspect of the disclosure, the disclosure provides a terminal device, and terminal device includes a processor, a transceiver connected to the processor, and a memory for storing an executable instruction of the processor. The processor is configured for loading and executing the executable instruction so as to implement said transmitting method for feedback information.

According to an aspect of the disclosure, the disclosure provides an access network equipment, and access network equipment includes a processor, a transceiver connected to the processor, and a memory for storing an executable instruction of the processor. The processor is configured for loading and executing the executable instruction so as to implement said receiving method for feedback information.

According to an aspect of the disclosure, a computer-readable storage medium is provided, and the readable storage medium stores an executable instruction. The executable instruction is loaded and executed by the processor to implement said transmitting method for feedback information or receiving method for feedback information.

BRIEF DESCRIPTION OF THE DRAWINGS

To make the technical solutions provided in the embodiments of the disclosure more clearly illustrated, several accompanying drawings required by the embodiments for description are briefly introduced as follows. Obviously, the drawings in the following description are merely some embodiments of the disclosure, and for a person having ordinary skill in the art, other drawings can be obtained based on these drawings without inventive effort.

DESCRIPTION OF THE EMBODIMENTS

To better illustrate the goal, technical solutions, and advantages of the disclosure, the accompanying drawings are included to provide a detailed description of the embodiments of the disclosure.

First, the terms involved in the embodiments of the disclosure are briefly introduced as follows.

Hybrid automatic repeat request (HARQ): It is a technology that combines forward error correction coding (FEC) and an automatic repeat request (ARQ). The FEC technology is used at the receiving end to correct the correctable part of all errors. Through error detection, data packets that cannot be corrected are determined. Data packets that cannot be corrected are discarded, and a request is made to the transmitter to retransmit the same data packet.

Full-process feedback mode: In the HARQ process-based feedback mode, a terminal device supports a maximum of N HARQ processes. When access network equipment (e.g., a base station) triggers a terminal device to perform full process feedback, no matter if the terminal device actually receives multiple HARQ processes, it always feeds back the ACK/NACK feedback information corresponding to the N processes to the access network device. The ACK/NACK information may be mapped to the feedback information codebook in order of the identification (or number) of the HARQ processes. The ACK/NACK information corresponding to the HARQ processes that is not received is set as the occupant information (e.g., NACK).

Figure 1:
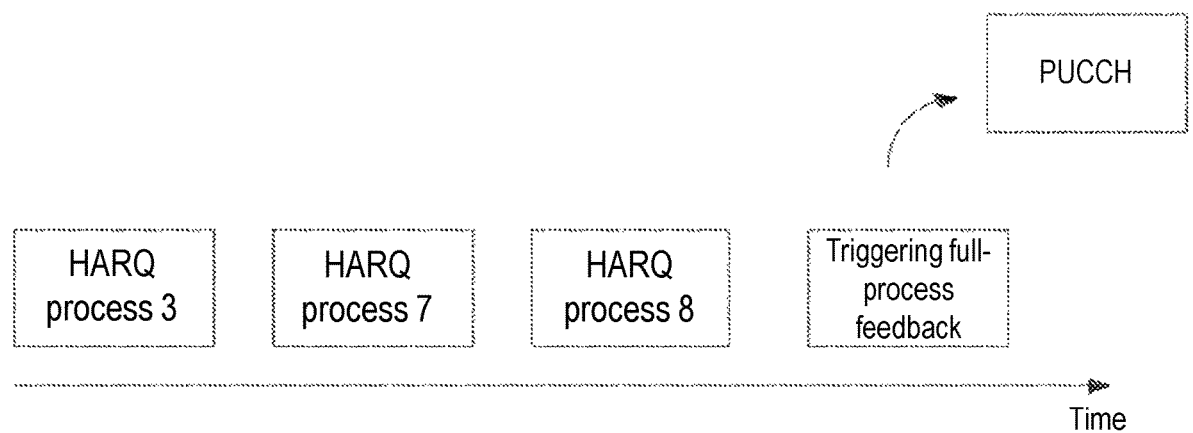
FIG. 1 is a schematic diagram of HARQ full-process feedback in the related art according to the disclosure.

Taking FIG. 1 as an example, it is assumed that a terminal device supports a maximum of 8 HARQ processes, one HARQ process is transmitted through one physical channel at a time, and each HARQ process corresponds to independent ACK/NACK feedback information. The terminal device receives HARQ process 3, HARQ process 7, and HARQ process 4. When the access network equipment triggers the terminal device to perform full-process feedback, the terminal device transmits feedback {NACK, NACK, NACK, bHARQ3, bHARQ4, NACK, NACK, bHARQ7} in a PUCCH, where bHARQi represents ACK/NACK feedback information corresponding to HARQ process i. The ACK/NACK information corresponding to HARQ process 0, HARQ process 1, HARQ process 2, HARQ process 5, and HARQ process 6 not received by the terminal device is set as the occupant information NACK.

Feedback mode based on the specified feedback group: In the feedback mode based on the HARQ process, the HARQ process transmits feedback information through the physical channel in a feedback group. When the access network equipment (e.g., a base station) triggers the terminal device to perform process feedback based on the feedback group, it indicates the specified feedback group that needs to perform feedback, and the terminal device reports the ACK/NACK feedback information corresponding to the HARQ process in the specified feedback group to the access network equipment.

Figure 2:
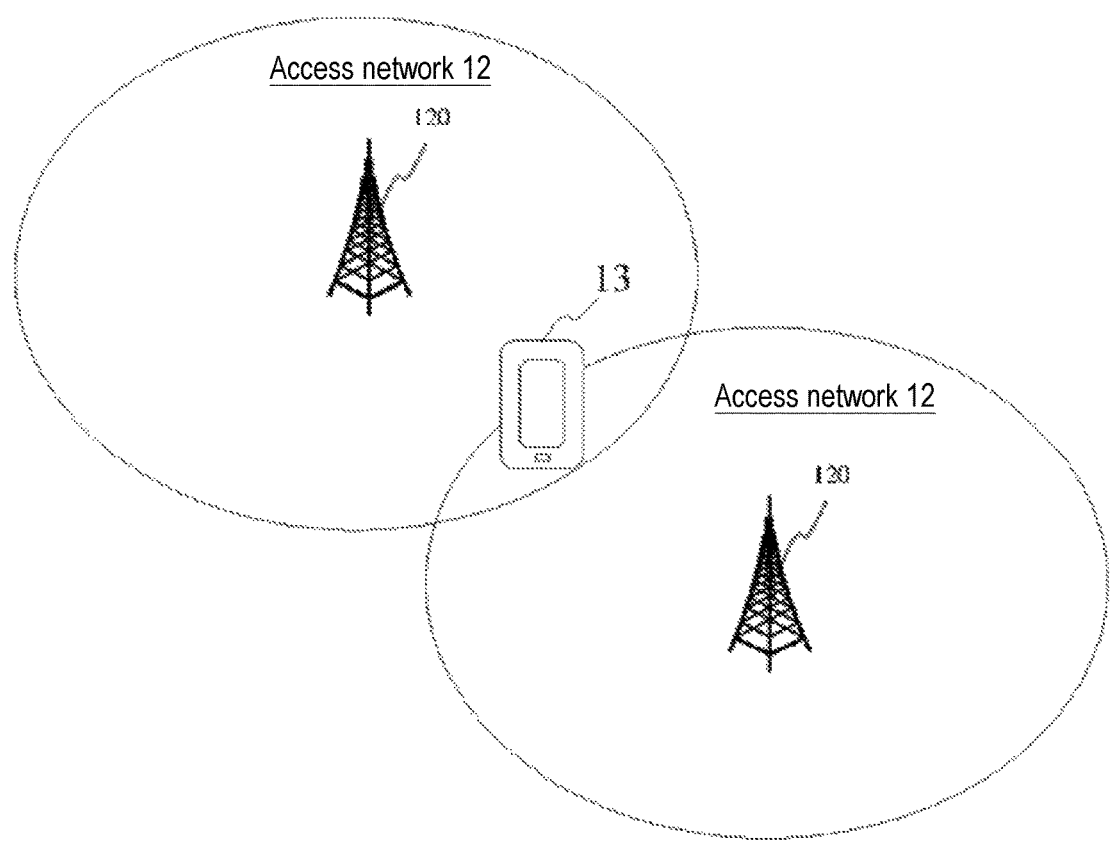
FIG. 2 is a block diagram of a communication system provided by an exemplary embodiment of the disclosure.

FIG. 2 is a block diagram of a communication system provided by an exemplary embodiment of the disclosure, and the communication system may include: an access network 12 and a terminal device 13.

The access network 12 schedules a HARQ process to transmit data, and the terminal device 13 performs information feedback on the HARQ process.

The access network 12 includes multiple access network equipments 120. Each access network equipment 120 may be a base station, and the base station is a device deployed in an access network to provide a wireless communication function for the terminal device. The base station may include various forms including macro base stations, micro base stations, relay stations, access points, and so on. Among systems using different wireless access technologies, the names of equipment with the base station function may be different, for example, such equipment is called eNodeB or eNB in the LTE system but is called gNodeB or gNB in the 5G NR-U system. As communication technology evolves, the description of "base station" may change. For convenience, in the embodiments of the disclosure, the above-mentioned devices that provide wireless communication functions for the terminal device 13 are collectively referred to as access network equipment.

The terminal device 13 may include various handheld devices, vehicle-mounted devices, wearable devices, and computing devices with wireless communication functions or other processing devices connected to a wireless modem, as well as various forms of user equipment, mobile stations, terminal devices, and so on. For ease of description, the devices mentioned above are collectively referred to as a terminal device. The access network equipment 120 and the terminal device 13 communicate with each other through a specific air interface technology, such as a Uu interface.

Figure 3:
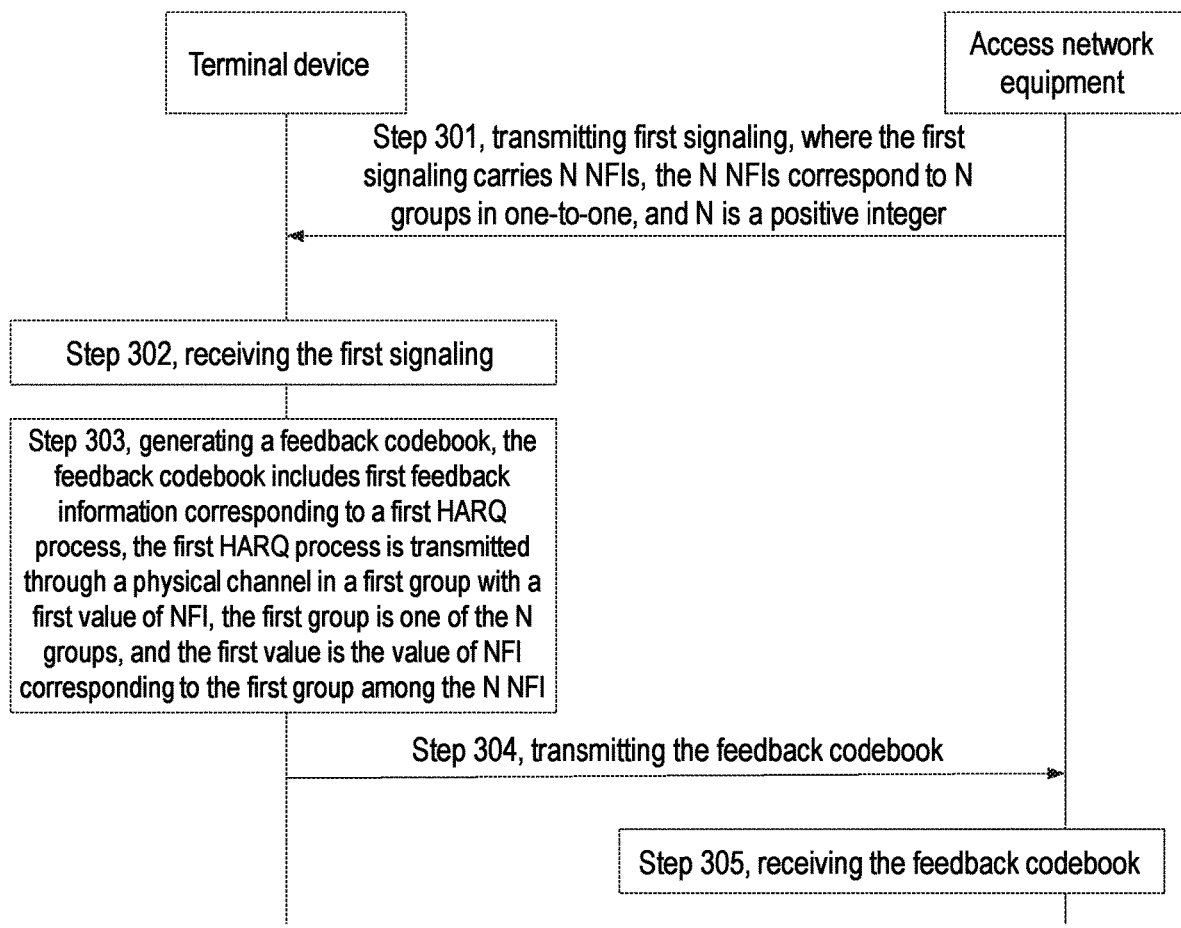
FIG. 3 is a flow chart of transmitting feedback information provided by an exemplary embodiment of the disclosure.

FIG. 3 is a flow chart of transmitting feedback information provided by an exemplary embodiment of the disclosure and is applied to the terminal device and the access network equipment shown in FIG. 2. The method includes the following steps.

In step 301, access network equipment transmits first signaling, the first signaling carries N new feedback indicator information, the N new feedback indicator information correspond to N groups in one-to-one, and N is a positive integer.

The first signaling is signaling that triggers simultaneous feedback of multiple HARQ processes (all or a group of HARQ) and carries signaling of the new feedback indicator information.

Optionally, the access network equipment triggers the terminal device to perform simultaneous feedback of multiple HARQ processes by transmitting the first signaling. The simultaneous feedback of multiple HARQ processes includes two forms: full-process feedback, or feedback group-based HARQ feedback.

The N groups corresponding to the N new feedback indicator information are feedback groups, and the feedback groups divide the physical channels. The HARQ processes are carried on the physical channels.

Optionally, one feedback group includes at least one physical channel. When the terminal device receives the first signaling transmitted by the access network equipment to trigger a specific feedback group, the terminal device transmits the ACK/NACK feedback information of the HARQ process carried on the physical channel included in the feedback group to the access network equipment.

Optionally, the number of physical channels included in each feedback group is the same or different.

Toggling of the new feedback indicator (NFI) is used to indicate that the ACK/NACK feedback information in the feedback group corresponding to the physical channel scheduled by the first signaling is cleared.

Figure 4:
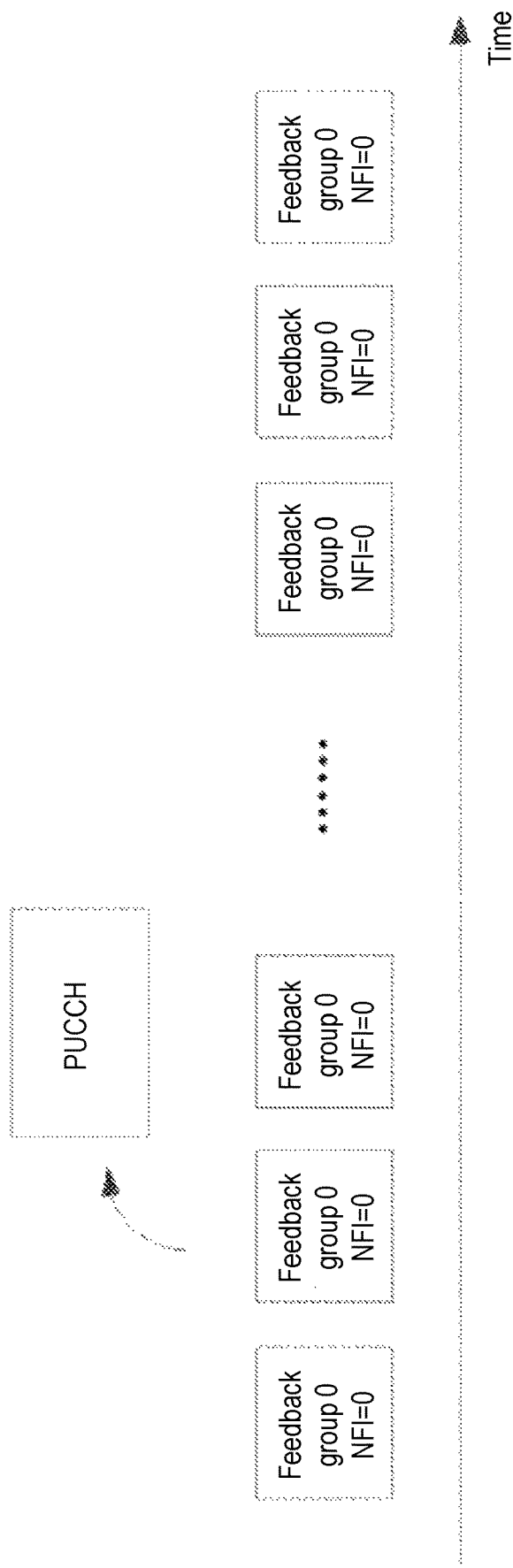
FIG. 4 is a schematic diagram of transmitting feedback information provided by an exemplary embodiment of the disclosure.

As shown in FIG. 4, after the ACK/NACK corresponding to NFI=0 of a feedback group 0 is successfully fed back through a PUCCH, the access network equipment may set the NFI to 1 when subsequently scheduling HARQ feedback of the feedback group 0. The NFI is toggled, indicating that the feedback group 0 restarts organizing, that is, the ACK/NACK feedback information corresponding to the previous NFI=0 is released.

In step 302, the terminal device receives the first signaling.

After receiving the first signaling, the terminal device simultaneously feeds back multiple HARQ processes. The simultaneous feedback of multiple HARQ processes includes: full-process feedback, or feedback group-based process feedback for the HARQ processes.

In step 303, the terminal device generates a feedback codebook, the feedback codebook includes first feedback information corresponding to a first HARQ process, the first HARQ process is transmitted through a physical channel in a first group with a first value of NFI, the first group is one of the N groups, and the first value is the value of NFI corresponding to the first group among the N NFIs.

The feedback codebook is a codebook containing feedback information corresponding to multiple HARQ processes. Multiple processes may be all HARQ processes supported by the terminal device or may be HARQ processes corresponding to a specified feedback group.

Optionally, the first feedback information includes: one of ACK and NACK. When the first feedback information is NACK, it means that the terminal device does not receive data correctly, and the access network equipment needs to use the first HARQ process corresponding to the feedback information to retransmit the data again. When the first feedback information is ACK, it means that the terminal device receives the data correctly, and the access network equipment uses the first HARQ process corresponding to the feedback information to transmit new data.

The first value is the value of the NFI corresponding to the first group to which the first HARQ process belongs among the N NFIs carried in the first signaling.

It should be noted that the first group corresponding to the first HARQ process is any group of the N groups.

Schematically, the first HARQ process is transmitted through the physical channel in the first group among the N groups. When the value of the new feedback indicator information corresponding to the first group is 1 and the value of the new feedback indicator information of the first group indicated in the first signaling is also 1, the feedback information of the first HARQ is included in the feedback codebook and transmitted to the access network equipment.

In step 304, the terminal device transmits the feedback codebook to the access network equipment.

In step 305, the access network equipment receives the feedback codebook.

The access network equipment learns the data feedback situation of each HARQ process through the received feedback codebook and determines whether to retransmit the data or transmit new data.

In view of the above, in the method provided by this embodiment, through the NFI information based on the feedback group (group for short), understanding ambiguity of the feedback information between the terminal device and the access network equipment is avoided. The number of feedback groups supported by the terminal device is less than the number of supported HARQ processes, indicating that the overhead of the NFI information of the group is low. On the other hand, the terminal device only needs to transmit the ACK/NACK information, and the understanding ambiguity between the terminal device and the base station may be avoided in this way. It thus can be seen that the overhead of uplink control signaling is low as well, and utilization efficiency of transmitted resources is improved.

Figure 5:
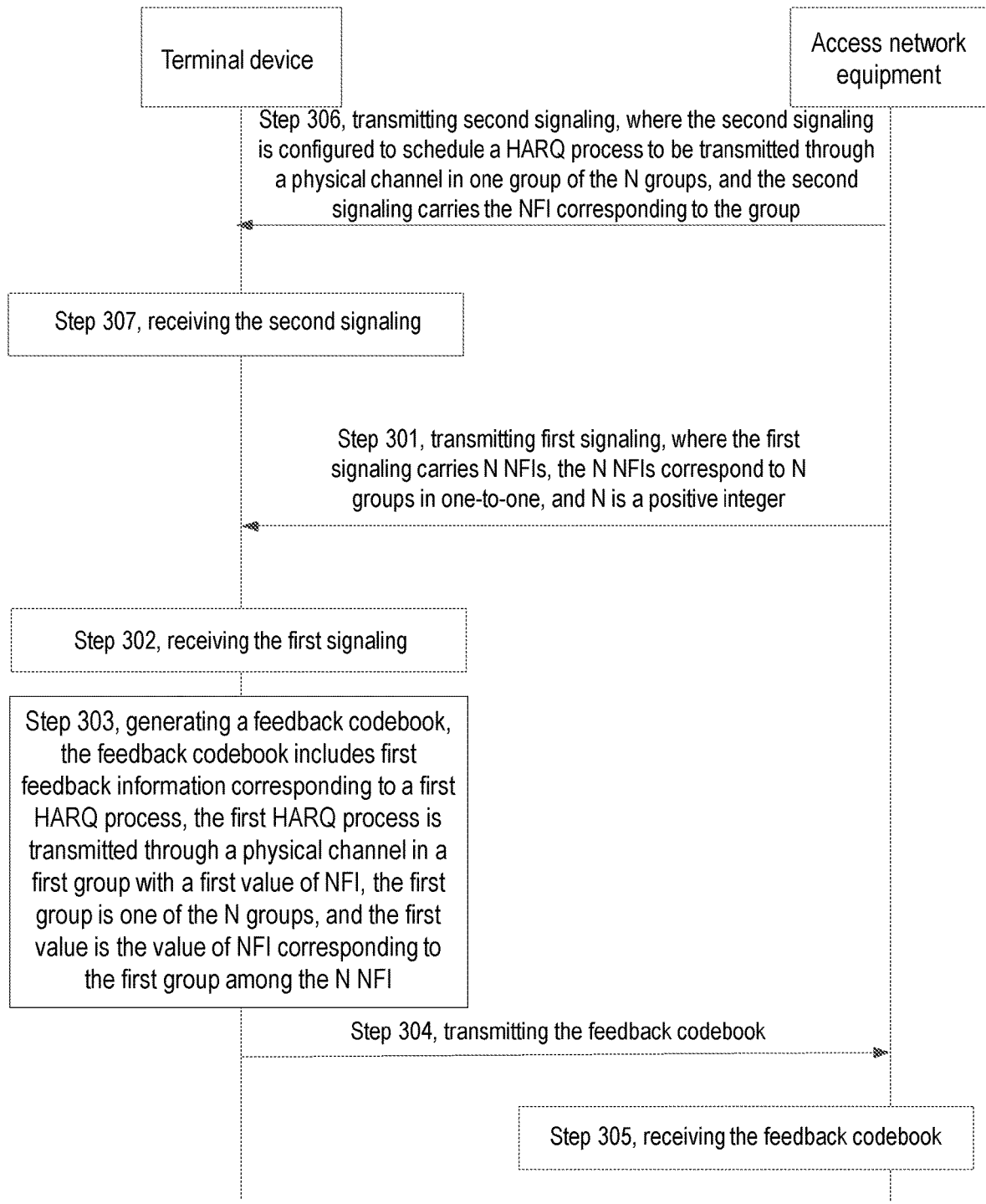
FIG. 5 is a flow chart of transmitting feedback information provided by an exemplary embodiment of the disclosure.

In an optional embodiment based on FIG. 3, FIG. 5 is a flow chart of transmitting feedback information provided by an exemplary embodiment of the disclosure. In this embodiment, before step 301 in FIG. 3, step 306 and step 307 are further included.

In step 306, the access network equipment transmits second signaling, where the second signaling is used for scheduling a HARQ process to be transmitted through a physical channel in one group of the N groups, and the second signaling carries the NFI corresponding to the group.

The second signaling is used to schedule the physical channel for HARQ process transmission.

Optionally, the second signaling is downlink control information (DCI), and the DCI is control information related to a physical downlink share channel (PDSCH) transmitted on a physical downlink control channel (PDCCH).

Optionally, the transmitting time of the second signaling is not later than the transmitting time of the first signaling.

The transmitting time includes at least one of the starting time of transmitting and the ending time of transmitting.

In step 307, the terminal device receives the second signaling.

The terminal device determines the feedback group to which the physical channel belongs and the value of the new feedback indicator information corresponding to the feedback group by receiving the second signaling.

After step 302, the terminal device determines the first value of the first HARQ process by receiving the first signaling. Only when the value of the new feedback indicator information corresponding to the group carried in the second signaling of the first HARQ process is the same as the first value, the feedback information corresponding to the HARQ process is generated into the feedback codebook.

In an exemplary embodiment, the first HARQ process is an HARQ process transmitted through multiple physical channels in $P_1$ groups, and the physical channels are used for transmitting a same HARQ process. The first feedback information is feedback information corresponding to the first HARQ process transmitted in a physical channel whose time is the last among multiple physical channels, where all values of NFI of the $P_1$ groups are the first value, and $P_1$ is a positive integer not greater than N.

The first HARQ process is any HARQ process. Alternatively, the first HARQ process is one of multiple HARQ processes that is required to report the feedback information which is determined according to the first signaling.

Optionally, the physical channel whose time is the last among multiple physical channels includes: a physical channel whose ending time is the last among multiple physical channels, or a physical channel whose starting time is the last among multiple physical channels.

Schematically, regarding HARQ process 0 transmitted by the terminal device through 2 physical channels in the $P_1$ groups, herein, in the case that the NFI of the $P_1$ group is the same as the first value of the feedback group in which the HARQ process 0 is located, the first feedback information is the feedback information corresponding to HARQ process 0 transmitted in the physical channel that is later in time among the 2 physical channels.

In an exemplary embodiment, the feedback codebook further includes second feedback information. The second feedback information is predetermined feedback information corresponding to a second HARQ process, and the second HARQ process is a HARQ process not being received by the terminal device in $P_2$ groups in which all values of NFI are a second value. the second value is a value of NFI corresponding to the $P_2$ groups among the N NFIs, where, the first value and the second value are the same or different, and $P_2$ is a positive integer not greater than N.

Optionally, the predetermined feedback information is NACK.

In an exemplary embodiment, the feedback codebook includes feedback information corresponding to M HARQ processes, and the M HARQ processes include the first HARQ process, where M is a maximum number of HARQ processes configured for the terminal device, and M is a positive integer not less than N.

M is not less than N, that is, the number of groups corresponding to the new feedback indicator information is less than or equal to the maximum number of HARQ processes.

Optionally, the feedback information corresponding to the M HARQ processes generates the feedback codebook according to a predetermined rule.

Optionally, the predetermined rule includes but not limited to: corresponding feedback information is mapped in ascending order of HARQ process numbers; the feedback information corresponding to the HARQ process that is not received is NACK; and the first feedback information is feedback information corresponding to the first HARQ process transmitted in a physical channel whose time is the last among multiple physical channels.

In an exemplary embodiment, the first signaling includes: first DCI scrambled using a dedicated radio network temporary identifier (RNTI), or a second DCI in a specified format, a third DCI transmitted using a specified control resource set, a fourth DCI transmitted using a specified search space, signaling transmitted using at least one specified sequence, where the values of N new feedback indicator information corresponding to the N groups obtained by different specified sequences are different, or signaling transmitted using a specified physical resource.

As shown in table one, when using at least one specified sequence to transmit signaling, the access network equipment is configured to be pre-configured with multiple available sequences to correspond to the different values of NFI of the groups. The access network equipment selects one of multiple sequences to transmit the sequence to the terminal device according to the actual demand this time. As shown in table 1, it is assumed that the terminal device supports a maximum of 2 groups, and the NFI corresponding to each feedback group has two value states, so the access network equipment needs to be pre-configured with 4 sequences.

TABLE ONE

| Sequence number | (NFI of group 0, NFI of group 1) |
| --- | --- |
| Sequence 1 | (0, 0) |
| Sequence 2 | (0, 1) |
| Sequence 3 | (1, 0) |
| Sequence 4 | (1, 1) |

Figure 6:
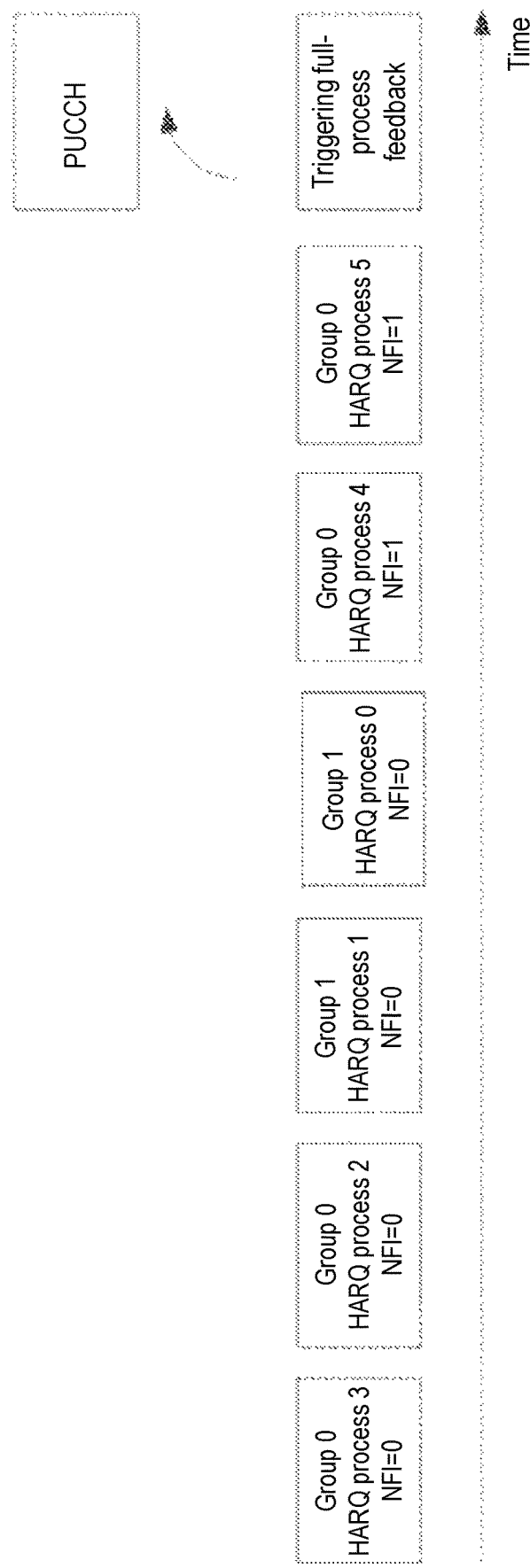
FIG. 6 is a schematic diagram of transmission of a HARQ process provided by an exemplary embodiment of the disclosure.

Schematically, as shown in FIG. 6, the maximum number of HARQ processes configured for the terminal device is 6, that is, the terminal device supports a maximum of 6 HARQ processes. It is assumed that the terminal device supports 2 feedback groups, that is, the number of groups corresponding to the new feedback indicator information is 2: group 0 and group 1. The HARQ process 3 and HARQ process 2 are transmitted through the physical channel in group 0. Next, HARQ process 1 and HARQ process 0 are transmitted through the physical channel in group 1. Next, HARQ process 4 and HARQ process 5 are transmitted through the physical channel in group 0.

It is indicated that the second value of group 0 is 1 and the second value of group 1 is 0 according to the first signaling. The HARQ process is scheduled to be transmitted through a physical channel in one of the 2 groups according to the second signaling, and the second signaling carries the value of the new feedback indicator information corresponding to the group. The value of the new feedback indicator information corresponding to group 0 is 0 in the first two transmissions in FIG. 6, which is different from the second value 1 corresponding to group 0 indicated by the first signaling. The value of the new feedback indicator information corresponding to the group 1 is 0 in the middle two transmissions in FIG. 6, which is the same as the second value 0 corresponding to group 1 indicated by the first signaling. The value of the new feedback indicator information corresponding to group 0 is 1 in the last two transmissions in FIG. 6, which is the same as the second value 1 corresponding to group 0 indicated by the first signaling. The feedback information corresponding to the HARQ process is generated into the feedback codebook only when the value of the new feedback indicator information corresponding to the group where the HARQ process is located is the same as the second value of each group indicated by the first signaling.

The corresponding feedback information is mapped according to the HARQ process numbers in ascending order, and the feedback codebook generated by the terminal device is {bHARQ0, bHARQ1, NACK, NACK, bHARQ4, bHARQ5}. Herein, bHARQ0 is the ACK/NACK feedback information of HARQ process 0 in group 1 (NFI=0), bHARQ1 is the ACK/NACK feedback information of HARQ process 1 in group 1 (NFI=0), bHARQ4 is the ACK/NACK feedback information of HARQ process 4 in group 0 (NFI=1), and bHARQ5 is the ACK/NACK feedback information of HARQ process 5 in group 0 (NFI=1).

The value of group 0 (NFI=0) where HARQ process 2 and HARQ process 3 are located is different from the value of the second value of group 0 indicated by the first signaling, so the terminal device does not receive HARQ process 2 and HARQ process 3 in the group (group 0 with NFI=1 and group 1 with NFI=0) in which the value of NFI is the second value, and the feedback information of these two processes is defined as NACK.

Figure 7:
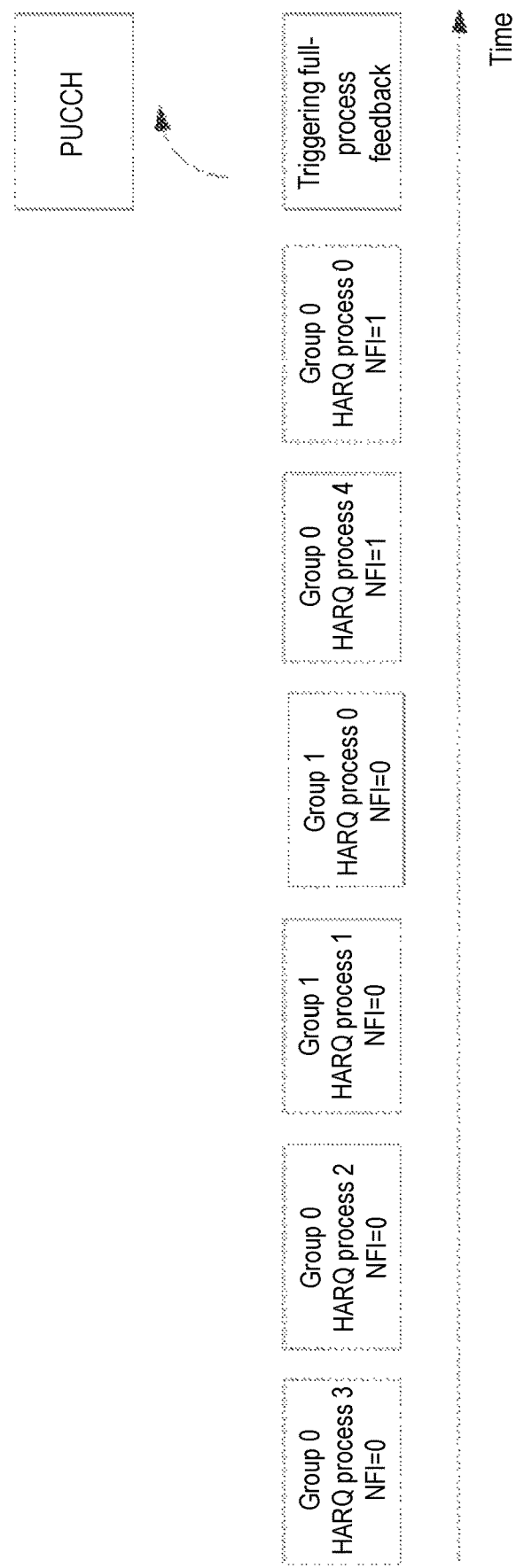
FIG. 7 is a schematic diagram of transmission of a HARQ process provided by an exemplary embodiment of the disclosure.

Schematically, as shown in FIG. 7, the maximum number of HARQ processes configured for the terminal device is 6, that is, the terminal device supports a maximum of 6 HARQ processes. It is assumed that the terminal device supports 2 feedback groups, that is, the number of groups corresponding to the new feedback indicator information is 2: group 0 and group 1. The HARQ process 3 and HARQ process 2 are transmitted through the physical channel in group 0. Next, HARQ process 1 and HARQ process 0 are transmitted through the physical channel in group 1. Next, HARQ process 4 and HARQ process 0 are transmitted through the physical channel in group 0.

It is indicated that the second value of group 0 is 1 and the second value of group 1 is 0 according to the first signaling. The HARQ process is scheduled to be transmitted through a physical channel in one of the 2 groups according to the second signaling, and the second signaling carries the value of the new feedback indicator information corresponding to the group. The value of the new feedback indicator information corresponding to group 0 is 0 in the first 2 transmissions in FIG. 7, which is different from the second value 1 corresponding to group 0 indicated by the first signaling. The value of the new feedback indicator information corresponding to the group 1 is 0 in the middle 2 transmissions in FIG. 7, which is the same as the second value 0 corresponding to group 1 indicated by the first signaling. The value of the new feedback indicator information corresponding to group 0 is 1 in the last 2 transmissions in FIG. 7, which is the same as the second value 1 corresponding to group 0 indicated by the first signaling. The feedback information corresponding to the HARQ process is generated into the feedback codebook only when the value of the new feedback indicator information corresponding to the group where the HARQ process is located is the same as the second value of each group indicated by the first signaling.

The corresponding feedback information is mapped according to the HARQ process numbers in ascending order, and the feedback codebook generated by the terminal device is {bHARQ0, bHARQ1, NACK, NACK, bHARQ4, NACK}. Herein, bHARQ0 is the ACK/NACK feedback information of HARQ process 0 in group 0 (NFI=1) (compared with HARQ process 0 in group 1, its transmission time is later), bHARQ1 is the ACK/NACK feedback information of HARQ process 1 in group 1 (NFI=0), and bHARQ4 is the ACK/NACK feedback information of HARQ process 4 in group 0 (NFI=1).

The value of group 0 (NFI=0) where HARQ process 4 and HARQ process 3 are located is different from the second value of group 0 indicated by the first signaling, so the terminal device does not receive HARQ process 4 and HARQ process 3 in the group in which the value of NFI is the second value, and the feedback information of these two processes is defined as NACK. Further, the feedback information to HARQ process 5 not received by the terminal device is also defined as NACK.

In view of the above, in the method provided by this embodiment, through the NFI information based on the feedback group (group for short), understanding ambiguity of the feedback information between the terminal device and the access network equipment is avoided. The number of feedback groups supported by the terminal device is less than the number of supported HARQ processes, indicating that the overhead of the NFI information of the group is low. On the other hand, the terminal device only needs to transmit the ACK/NACK information, and the understanding ambiguity between the terminal device and the access network equipment may be avoided in this way. It thus can be seen that the overhead of uplink control signaling is low as well, and utilization efficiency of transmitted resources is improved.

The above HARQ feedback supports two forms:

First: Full-process feedback mode;

Second: Feedback mode based on the specified feedback group.

Regarding the HARQ process feedback of the first form:

The feedback mode in the foregoing embodiments is the full-process feedback mode, that is, after receiving the first signaling, the terminal device determines the HARQ feedback information that needs to be fed back in each feedback group based on NFI of all HARQ processes. The feedback codebook includes feedback information of all downlink HARQ processes supported on the terminal device.

As shown in FIG. 6, the maximum number of downlink HARQ processes configured for the terminal device is 6, that is, the terminal device supports a maximum of 6 HARQ processes. The terminal device supports two feedback groups: group 0 and group 1. The HARQ process 3 and HARQ process 2 are transmitted through the physical channel in group 0. Next, HARQ process 1 and HARQ process 0 are transmitted through the physical channel in group 1. Next, HARQ process 4 and HARQ process 5 are transmitted through the physical channel in group 0.

It is indicated that the second value of group 0 is 1 and the second value of group 1 is 0 according to the first signaling. The feedback codebook generated by the terminal device is {bHARQ0, bHARQ1, NACK, NACK, bHARQ4, bHARQ5}. Herein, bHARQ0 is the ACK/NACK feedback information of HARQ process 0 in group 1 (NFI=0), bHARQ1 is the ACK/NACK feedback information of HARQ process 1 in group 1 (NFI=0), bHARQ4 is the ACK/NACK feedback information of HARQ process 4 in group 0 (NFI=1), and bHARQ5 is the ACK/NACK feedback information of HARQ process 5 in group 0 (NFI=1). Herein, since the NFI in HARQ process 2 and HARQ process 3 is different from the NFI indicated by the first signaling, the occupant information NACK is used for filling.

Regarding the HARQ process feedback of the second form:

The first signaling used to trigger simultaneous feedback of multiple HARQ processes further includes the following information:

indicating information used to indicate $P_3$ groups among the N groups, where the feedback information of the $P_3$ groups is required to be reported, and $P_3$ is not greater than the N. That is, the $P_3$ groups are specified feedback groups, which require the terminal device to report the HARQ feedback information to the base station.

In an exemplary embodiment, the feedback codebook includes feedback information corresponding to a third HARQ process. The third HARQ process is transmitted through a physical channel in a second group with a third value of NFI, the second group is one of the $P_3$ groups, and the third value is a value of NFI corresponding to the second group among the NNFIs. Taking FIG. 7 as an example, it is assumed that the first signaling includes indicating information configured for indicating group 0 and group 1, that is, group 0 and group 1 are groups that are required to report the feedback information. Herein, the third value corresponding to group 0 is 1, and the third value corresponding to group 1 is 0.

Since both group 0 and group 1 are indicated by the first signaling, the terminal device performs full HARQ process feedback. The feedback codebook generated by the terminal device is {bHARQ0, bHARQ1, NACK, NACK, bHARQ4, NACK}. Herein, bHARQ0 is the ACK/NACK feedback information of HARQ process 0 in group 0 (NFI=1), bHARQ1 is the ACK/NACK feedback information of HARQ process 1 in group 1 (NFI=0), bHARQ4 is the ACK/NACK feedback information of HARQ process 4 in group 0 (NFI=1), and NACK is the occupant information corresponding to other processes.

In another implementation manner, it is assumed that the first signaling includes indicating information configured for indicating group 0, that is, group 0 is a group that is required to report the feedback information. Herein, the third value corresponding to group 0 is 1.

Since only group 0 is indicated by the first signaling, the terminal device performs feedback based on the feedback group. The feedback codebook generated by the terminal device is {bHARQ4, bHARQ0}. Herein, bHARQ0 is the ACK/NACK feedback information of HARQ process 0 in group 0 (NFI=1), and bHARQ4 is the ACK/NACK feedback information of HARQ process 4 in group 0 (NFI=1).

In view of the foregoing, in the method provided by this embodiment, the first signaling that triggers the process feedback includes the indicating information of the groups, which is used to determine transmission of the feedback information of the HARQ processes corresponding to which groups among the N groups and is used not to perform feedback on the HARQ process in the group that does not meet the condition, and the transmitted resources are saved in this way.

Figure 8:
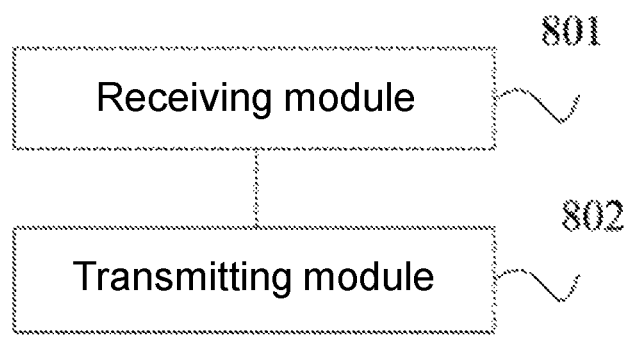
FIG. 8 is a schematic view of a transmitting device for feedback information provided by an exemplary embodiment of the disclosure.

FIG. 8 is a schematic view of a transmitting device for feedback information provided by an exemplary embodiment of the disclosure. The device includes a receiving module 801 and a transmitting module 802.

The receiving module 801 is configured for receiving first signaling. The first signaling carries N new feedback indicators (NFIs), the N NFIs correspond to N groups in one-to-one, and N is a positive integer.

The transmitting module 802 is configured for transmitting a feedback codebook. The feedback codebook includes first feedback information corresponding to a first HARQ process. The first HARQ process is transmitted through a physical channel in a first group with a first value of NFI, the first group is one of the N groups, and the first value is the value of NFI corresponding to the first group among the N NFIs.

In an exemplary embodiment, the first HARQ process is an HARQ process transmitted through multiple physical channels in $P_1$ groups, and the physical channels are used for transmitting a same HARQ process. The first feedback information is feedback information corresponding to the first HARQ process transmitted in a physical channel whose time is the last among multiple physical channels, where all values of NFI of the $P_1$ groups are the first value, and $P_1$ is a positive integer not greater than N.

In an exemplary embodiment, the physical channel whose time is the last among multiple physical channels includes: a physical channel whose ending time is the last among multiple physical channels, or a physical channel whose starting time is the last among multiple physical channels.

In an exemplary embodiment, the feedback codebook further includes second feedback information. The second feedback information is predetermined feedback information corresponding to a second HARQ process, and the second HARQ process is a HARQ process not being received by the terminal device in $P_2$ groups in which all values of NFI are a second value. The second value is a value of NFI corresponding to the $P_2$ groups among the N NFIs, where $P_2$ is a positive integer not greater than N.

In an exemplary embodiment, the predetermined feedback information is NACK.

In an exemplary embodiment, the receiving module 801 is configured for receiving second signaling. The second signaling is used for scheduling a HARQ process to be transmitted through a physical channel in one group of the N groups, and the second signaling carries the new feedback indicator information corresponding to the group.

In an exemplary embodiment, the feedback codebook includes feedback information corresponding to M HARQ processes, and the M HARQ processes include the first HARQ process, where M is a maximum number of HARQ processes configured for the terminal device, and M is a positive integer not less than N.

In an exemplary embodiment, the feedback information corresponding to the M HARQ processes generates the feedback codebook according to a predetermined rule. In an exemplary embodiment, the first signaling further includes: indicating information used to indicate $P_3$ groups among the N groups, where the feedback information of the $P_3$ groups is required to be reported, and $P_3$ is not greater than the N.

In an exemplary embodiment, the feedback codebook includes feedback information corresponding to a third HARQ process. The third HARQ process is transmitted through a physical channel in a second group with a third value of NFI, the second group is one of the $P_3$ groups, and the third value is a value of NFI corresponding to the second group among the NNFIs.

In an exemplary embodiment, the first signaling includes: first DCI scrambled using a dedicated RNTI, or a second DCI in a specified format, a third DCI transmitted using a specified control resource set, a fourth DCI transmitted using a specified search space, signaling transmitted using at least one specified sequence, where the values of N new feedback indicator information corresponding to the N groups obtained by different specified sequences are different, or signaling transmitted using a specified physical resource.

Figure 9:
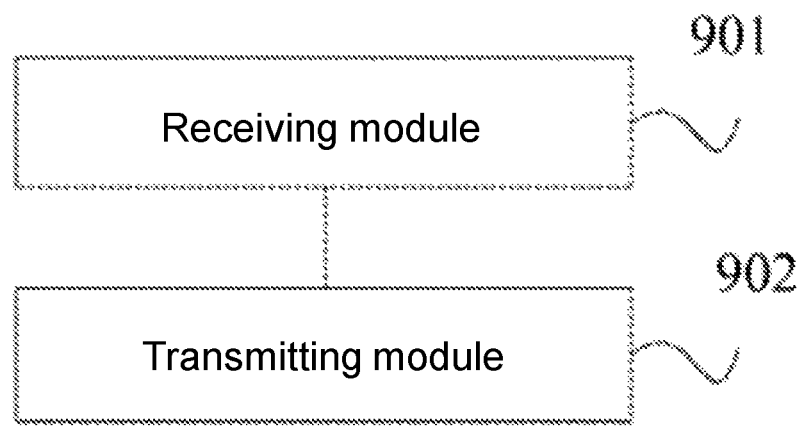
FIG. 9 is a schematic view of a receiving device for feedback information provided by an exemplary embodiment of the disclosure.

FIG. 9 is a schematic view of a receiving device for feedback information provided by an exemplary embodiment of the disclosure. The device includes: a transmitting module 901 and a receiving module 902.

The transmitting module 901 is configured for transmitting first signaling. The first signaling carries N new feedback indicators (NFIs), the N NFIs correspond to N groups in one-to-one, and N is a positive integer.

The receiving module 902 is configured for receiving a feedback codebook. The feedback codebook includes first feedback information corresponding to a first HARQ process. The first HARQ process is transmitted through a physical channel in a first group with a first value of NFI, the first group is one of the N groups, and the first value is the value of NFI corresponding to the first group among the N NFIs.

In an exemplary embodiment, the transmitting module 901 is configured for transmitting second signaling. The second signaling is used for scheduling a HARQ process to be transmitted through a physical channel in one group of the N groups, and the second signaling carries the NFI corresponding to the group.

In an exemplary embodiment, the feedback codebook includes feedback information corresponding to M HARQ processes, and the M HARQ processes include the first HARQ process, where M is a maximum number of HARQ processes configured for the terminal device, and M is a positive integer not less than N.

In an exemplary embodiment, the first signaling further includes: indicating information used to indicate $P_3$ groups among the N groups, where the feedback information of the $P_3$ groups is required to be reported, and $P_3$ is not greater than the N.

In an exemplary embodiment, the feedback codebook includes feedback information corresponding to a third HARQ process. The third HARQ process is transmitted through a physical channel in a second group with a third value of NFI, the second group is one of the $P_3$ groups, and the third value is a value of NFI corresponding to the second group among the NNFIs.

In an exemplary embodiment, the first signaling includes: first DCI scrambled using a dedicated RNTI, or a second DCI in a specified format, a third DCI transmitted using a specified control resource set, a fourth DCI transmitted using a specified search space, signaling transmitted using at least one specified sequence, where the values of N new feedback indicator information corresponding to the N groups obtained by different specified sequences are different, or signaling transmitted using a specified physical resource.

Figure 10:
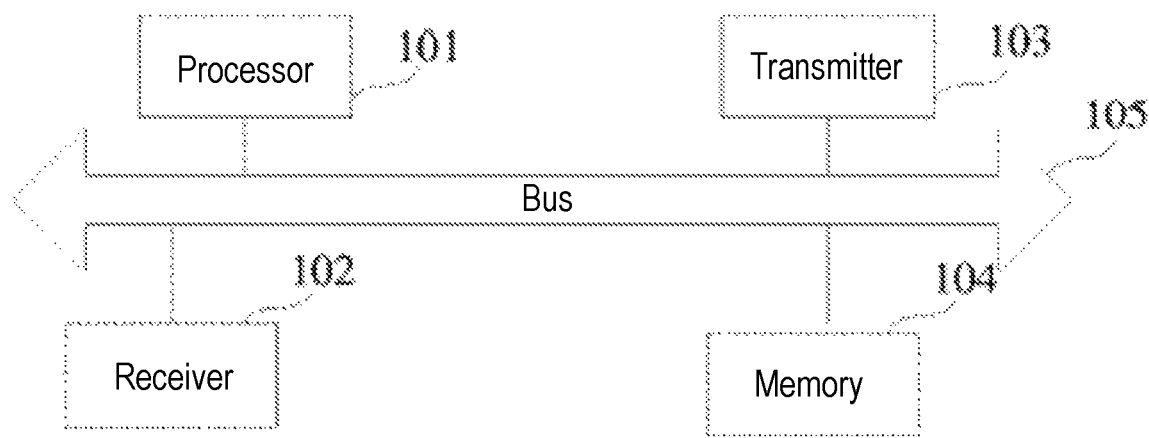
FIG. 10 is a schematic view of a structure of communication equipment provided by an exemplary embodiment of the disclosure.

FIG. 10 is a schematic view of a structure of communication equipment (a terminal device or access network equipment) provided by an exemplary embodiment of the disclosure. The communication equipment includes a processor 101, a receiver 102, a transmitter 103, a memory 104, and a bus 105.

The processor 101 includes one or more processing cores, and the processor 101 executes various functional applications and information processing by running software programs and modules.

The receiver 102 and the transmitter 103 may be implemented as a communication component, and the communication component may be a communication chip.

The memory 104 is connected to the processor 101 through the bus 105.

The memory 104 may be used to store at least one instruction, and the processor 101 is used to execute the at least one instruction to implement each step in the foregoing method embodiments.

In addition, the memory 104 may be implemented by any type of volatile or non-volatile storage device or a combination thereof. The volatile or non-volatile storage device includes, but is not limited to, a magnetic disk or an optical disk, an electrically erasable programmable read-only memory (EEPROM), an erasable programmable read-only memory (EPROM), a static random access memory (SRAM), a read-only memory (ROM), a magnetic memory, a flash memory, and a programmable read-only memory (PROM).

In an exemplary embodiment, a computer-readable storage medium is further provided, and the computer-readable storage medium stores at least one instruction, at least one program, a code set, or an instruction set. The at least one instruction, the at least one program, the code set, or the instruction set is loaded and executed by the processor to implement the transmitting method for feedback information or the receiving method for feedback information executed by the communication equipment provided by the foregoing method embodiments.

A person of ordinary skill in the art can understand that all or part of the steps in the foregoing embodiments may be completed by hardware or may be completed by a program instructing related hardware. The program may be stored in a computer-readable storage medium, and the storage medium may be a read-only memory, a magnetic disk, or an optical disk.

The above description is only optional embodiments of the disclosure and is not intended to limit the disclosure. Any modifications, equivalent replacements, and modifications made without departing from the spirit and principles of the disclosure should fall within the protection scope of the disclosure.

What is claimed is:

1. A transmitting method for feedback information, applied in a terminal device, the method comprising:
   receiving first signaling, wherein the first signaling carries N new feedback indicators (NFIs), the N NFIs is corresponding to N groups in one-to-one, N is a positive integer, and the first signaling further comprises:
   indicating information used to indicate $P_3$ groups among the N groups,
   wherein feedback information of the $P_3$ groups is required to be reported, and $P_3$ is not greater than the N; and
   transmitting a feedback codebook, wherein the feedback codebook comprises first feedback information corresponding to a first HARQ process, the first HARQ process is transmitted through a physical channel in a first group with a first value of NFI, the first group is one of the N groups, the first value is the value of NFI corresponding to the first group among the N NFIs, the feedback codebook comprises feedback information corresponding to a second HARQ process, the second HARQ process is transmitted through a physical channel in a second group with a second value of NFI, the second group is one of the $P_3$ groups, and the second value is a value of NFI corresponding to the second group among the N NFIs.

2. The method according to claim 1, further comprising:
   receiving second signaling, wherein the second signaling is used for scheduling a HARQ process to be transmitted through a physical channel in one group of the N groups, and the second signaling carries the NFI corresponding to the group.

3. The method according to claim 2, wherein a transmitting time of the second signaling is not later than a transmitting time of the first signaling.

4. The method according to claim 1, wherein the feedback codebook comprises feedback information corresponding to M HARQ processes, and the M HARQ processes comprise the first HARQ process,
wherein M is a maximum number of HARQ processes configured for the terminal device, and M is a positive integer not less than N.

5. The method according to claim 1, wherein the first signaling comprises:
first downlink control information (DCI) scrambled using a dedicated radio network temporary identity (RNTI);
a second DCI in a specified format;
a third DCI transmitted using a specified control resource set;
a fourth DCI transmitted using a specified search space;
signaling transmitted using at least one specified sequence, wherein the values of N NFIs corresponding to the N groups obtained by different specified sequences are different; or
signaling transmitted using a specified physical resource.

6. The method according to claim 1, wherein a value of N is 2.

7. A receiving method for feedback information, applied in access network equipment, the method comprising:
transmitting first signaling, wherein the first signaling carries N new feedback indicators (NFIs), the N NFIs correspond to N groups in one-to-one, and N is a positive integer, and the first signaling further comprises:
indicating information used to indicate $P_3$ groups among the N groups,
wherein feedback information of the $P_3$ groups is required to be reported, and $P_3$ is not greater than the N; and
receiving a feedback codebook, wherein the feedback codebook comprises first feedback information corresponding to a first HARQ process, the first HARQ process is transmitted through a physical channel in a first group with a first value of NFI, the first group is one of the N groups, the first value is the value of NFI corresponding to the first group among the N NFIs, the feedback codebook comprises feedback information corresponding to a second HARQ process, the second HARQ process is transmitted through a physical channel in a second group with a second value of NFI, the second group is one of the $P_3$ groups, and the second value is a value of NFI corresponding to the second group among the N NFIs.

8. The method according to claim 7, further comprising:
transmitting second signaling, wherein the second signaling is used for scheduling a HARQ process to be transmitted through a physical channel in one group of the N groups, and the second signaling carries the NFI corresponding to the group.

9. The method according to claim 7, wherein the feedback codebook comprises feedback information corresponding to M HARQ processes, and the M HARQ processes comprise the first HARQ process,
wherein M is a maximum number of HARQ processes configured for a terminal device, and M is a positive integer not less than N.

10. A transmitting device for feedback information, comprising a receiver and a transmitter,
wherein the receiver is configured for receiving first signaling, the first signaling carries N new feedback indicators (NFIs), the N NFIs correspond to N groups in one-to-one, [and] N is a positive integer, and the first signaling further comprises:
indicating information used to indicate $P_3$ groups among the N groups,
wherein feedback information of the $P_3$ groups is required to be reported, and $P_3$ is not greater than the N,
wherein the transmitter is configured for transmitting a feedback codebook, the feedback codebook comprises first feedback information corresponding to a first HARQ process, the first HARQ process is transmitted through a physical channel in a first group with a first value of NFI, the first group is one of the N groups, the first value is the value of NFI corresponding to the first group among the N NFIs, the feedback codebook comprises feedback information corresponding to a second HARQ process, the second HARQ process is transmitted through a physical channel in a second group with a second value of NFI, the second group is one of the $P_3$ groups, and the second value is a value of NFI corresponding to the second group among the N NFIs.

11. The device according to claim 10, wherein
the receiver is configured for receiving second signaling, the second signaling is used for scheduling a HARQ process to be transmitted through a physical channel in one group of the N groups, and the second signaling carries the NFI corresponding to the group.

12. The device according to claim 11, wherein a transmitting time of the second signaling is not later than a transmitting time of the first signaling.

13. The device according to claim 10, wherein the feedback codebook comprises feedback information corresponding to M HARQ processes, and the M HARQ processes comprise the first HARQ process,
wherein M is a maximum number of HARQ processes configured for the terminal device, and M is a positive integer not less than N.

14. The device according to claim 10, wherein a value of N is 2.

* * * * *